Oct. 26, 1954        T. J. NOWAK        2,692,755
PROCESS AND APPARATUS FOR LOGGING BOREHOLES
Filed Feb. 19, 1951
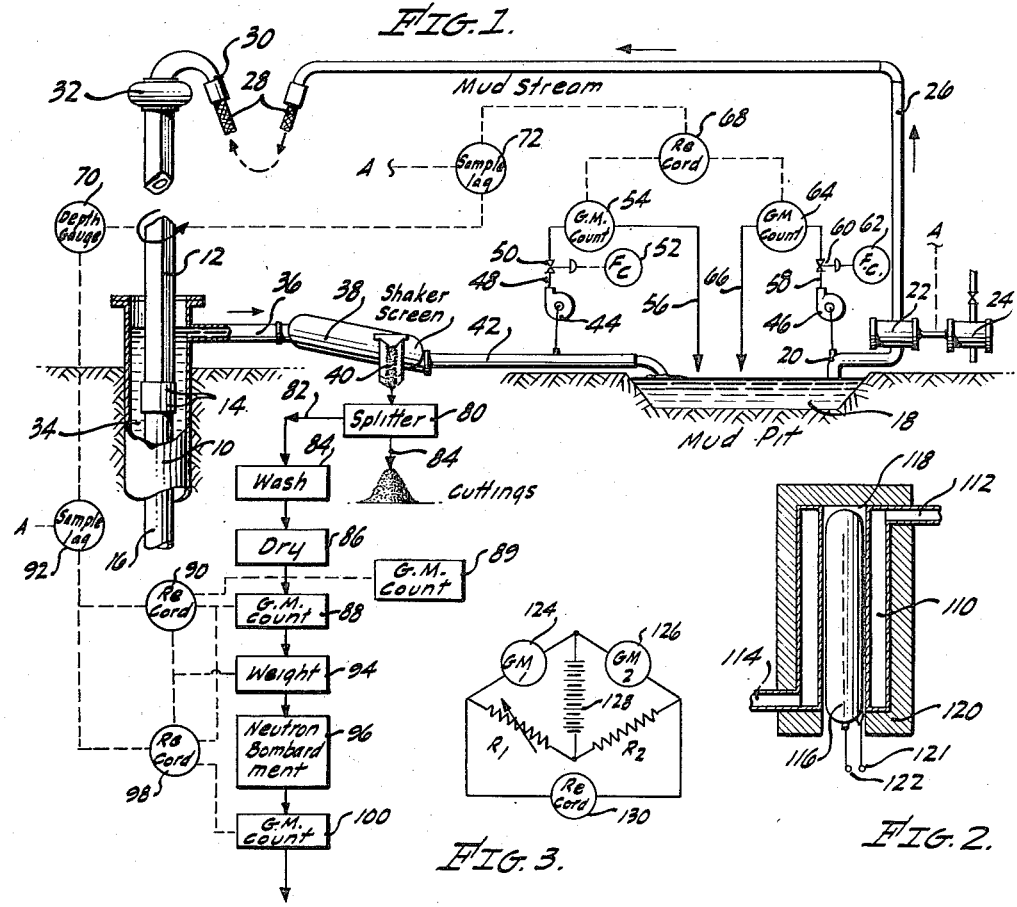
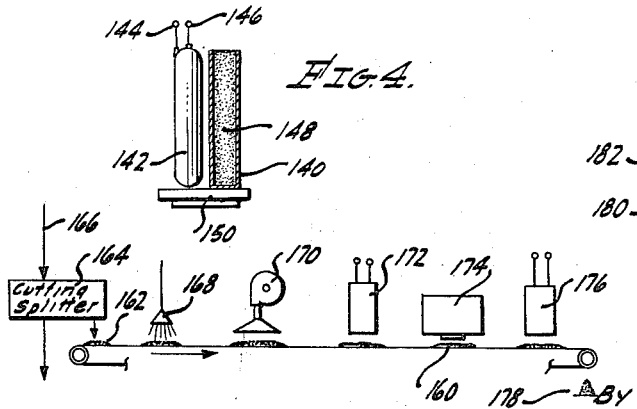
INVENTOR.
THEODORE J. NOWAK,
AGENT.

Patented Oct. 26, 1954

2,692,755

UNITED STATES PATENT OFFICE 2,692,755

PROCESS AND APPARATUS FOR LOGGING BOREHOLES

Theodore J. Nowak, San Pedro, Calif., assignor to Union Oil Company of California, Los Angeles, Calif., a corporation of California Application February 19, 1951, Serial No. 211,587

16 Claims. (Cl. 255—1.8)

This invention relates to the characterizing of formations penetrated by a bore hole into the earth's crust and particularly relates to the logging of such formations by radio-active means during the progress of the drilling.

Radioactive well logging is known and is widely accepted since it is applicable to the logging of formations penetrated by cased bore holes and has been particularly applied to the logging of old wells in which complete geologic data were not obtained either during drilling or before the hole was cased. Such radioactive logging methods are particularly desirable to locate formations which are porous and possibly contain valuable fluids so that the casing may then be gun-perforated and the porous formation produced.

Two kinds of procedures are in general application for radioactive logging; the first involves the measurement of the natural gamma-ray radiation of the formations and the other involves measurement of induced radiation of such formations caused by neutron bombardment thereof employing an intense neutron source. Following bombardment the induced gamma-ray activity is determined. The two types of radioactivity logging indicate different features of the formation, some of which cannot be indicated by both types.

The natural radioactivity of rock results predominantly in the decay of uranium, thorium and actinium as parents of a decay series including some forty unstable elements, all of which terminate in a non-radioactive isotope of lead. All natural rock contains some of these elements. The igneous rocks, the source of these radioactive elements, metamorphose and the products thus formed are deposited in sedimentary layers in which the distribution of radioactive elements is non-uniform from one sediment to another. Pure limestones and sandstones possess the least natural radioactivity. Shaley limestones and sandstones which contain therefore sedimentary fractions are somewhat more radioactive. The shales and like sedimentary formations contain the highest radioactivity. Radioactive potassium contained in the shale minerals further contributes to the radioactivity of such formations. By passing an ionization chamber known as a Geiger-Müller counter adjacent the formation an ion current is induced between the charged electrodes of the counter which is proportional to the instant gamma-ray activity. Thus by amplifying and measuring the ion current a precise indication of the natural radioactivity as a function of depth of the bore hole may be obtained. Such data is plotted on a long record sheet and is termed a "gamma-ray curve" or "gamma-ray profile" for the particular bore hole thus logged.

The induced radioactivity of the rock is measured in substantially the same way and conveniently may be determined at the same time as the gamma-ray curve is determined. A Geiger-Müller counter follows a source of neutrons through the bore hole and, following radiation of the penetrated formations, the induced radioactivity is indicated by an ion current proportional to the radioactivity. A particular feature of the induced radioactivity log is the ability to detect formations containing water or, more specifically, containing hydrogen in combined form. Although neutrons readily penetrate the steel casing of the well, they are materially slowed or reflected in the presence of hydrogen compounds. Consequently, in the radiation of a formation containing water the induced radioactivity is considerably less because of the effect of hydrogen on the neutrons prior to their striking solid materials and resulting in gamma-ray radiation. The induced radioactivity thus determined is therefore inversely proportional to the hydrogen content of the strata irradiated and thus may be termed a hydrogen log. Strata containing hydrocarbons or water show up plainly in such a log. Hard sandstones and limestones can be differentiated from other strata. Porous zones in a uniform limestone are easily detectable. Shale formations give the lowest induced radioactivity because of their water content while porous limestones and sandstones containing fluid give somewhat higher intensities. The harder formations such as igneous rocks give the highest of all. The data thus obtained is plotted as a function of depth and is plotted as a "neutron log or profile" of the well.

Heretofore gamma-ray and neutron curves have been determined by using an instrument containing a Geiger-Müller counter and perhaps a neutron source in the case of neutron curve determination. The drilling tools are removed from the hole and the logging instrument is passed through the bore hole at a uniform rate of between 500 and 1500 feet per hour and a continuous recording is made of depth and gamma-ray activity. One disadvantage of this type of operation is the necessity for completely stopping the drilling operation for a considerable length of time so that the well may be logged. It is of further disadvantage in that the well must be drilled before the formations penetrated can be located. Thus, prospective formations may be passed without notice, to be later found by the logging after an excessive quantity of hole has been drilled. It is to the alleviation of these difficulties and to the provision of an improved process and apparatus for the radioactivity logging of bore holes during drilling that the present invention is directed.

It is therefore a primary object of the present invention to provide for the radioactivity logging of bore holes without the cessation of drilling operations.

A further object of the present invention is to permit determination of the gamma-ray natural radioactivity of formations as they are penetrated in drilling operations.

A further object of this invention is to permit the neutron logging of formations during drilling.

It is an additional object of the present invention to continuously determine the natural and the induced radioactivity of the drilling fluid as well as the drill cuttings produced during drilling.

An additional object of the present invention is to provide a continuous process and apparatus for recording the natural and the induced radioactivity of the formations as they are penetrated during drilling operations.

Other objects and advantages of the operation will become apparent to those skilled in the art as the description thereof proceeds.

Briefly, the present invention comprises in a rotary drilling operation the continuous sampling of the recirculating drilling fluid stream and the drill cuttings separated from the shaker screen and the determination of the natural radioactivity of the drilling fluid and the drill cuttings as well as a determination of the induced radioactivity of the cuttings alone.

When drilling through hard formations considerable drill cuttings are produced which are carried from the bottom of the hole to the surface by the circulating drilling fluid stream and are there separated from the fluid by the means of a shaker screen. The cuttings-free drilling fluid is recirculated to a drilling fluid reservoir from which it is recirculated through the drill string into the hole while the cuttings are ordinarily discarded. During drilling through soft formations, including soft shales and clays, very little if any cuttings are produced and considerable material is ground up by the drill bit and the jetting action of the drilling fluid, whereby the soft material is assimilated into the drilling fluid and recirculated therewith. The radioactive materials accumulate therefor, causing the radioactivity of the circulating fluid which is removed from the hole to be different from that introduced into the hole.

Thus, in the process of the present invention a sample stream of drilling fluid is taken from the discharge stream flowing from the well into the mud pit and another sample is taken from the inlet stream of drilling fluid pumped from the mud pit back into the well. Both sample streams are measured for natural radioactivity. The radioactivity indicated from the drilling fluid pumped into the well is the same as that discharged through the drill bit during the drilling. The radioactivity indicated in the stream of drilling fluid flowing from the well is the same as that of the entering drilling fluid plus what natural radioactivity was picked up by the assimilation of radioactive materials. Separate first and second Geiger-Müller counters are employed to "count" the entering and the discharging drilling fluid streams. The output from these counters is preferably applied to a differential recorder which records the differential radioactivity of the drilling fluid as a function of the depth at which drilling is proceeding, with a correction being applied for sample lag according to the well known procedures. If desired the absolute values of the drilling fluid radioactivity may be recorded along with the differential. Such a correction is necessary due to the transit time of drilling fluid from the drill bit up through the annulus between the drill string and the walls of the bore hole into the mud pit. In this manner a series of points may be plotted by the recorder showing the change in radioactivity of the drilling fluid from one side of the bit to the other, giving a continuous index of the natural radioactivity of the materials assimilated during drilling into the drilling fluid.

In the radioactivity logging procedure of the present invention the drill cuttings removed from the shaker screen during drilling are sampled and passed through a special sequence of steps which permits the determination of the natural and the induced specific radioactivity of the harder materials penetrated by the bore hole. A continuous proportioning device receives the entire output of drill cuttings from the shaker screen and separates a small percentage thereof as a sample while discarding the remainder. Such proportioning devices are usually termed "splitters" and are readily obtainable commercially. The sample of cuttings is then washed to remove residual drilling fluid and subsequently "dried." A known mass and volume of the dried cuttings, from which surface liquids only are removed without disturbance of fluids within the rock, are placed with a fixed geometry relative to a third Geiger-Müller counter by means of which the natural radioactivity of the cuttings may be measured. The output of this counter is connected to a recorder which is corrected for sample lag and a plot is made continuously in a series of points of natural radiation as a function of depth. Subsequently the same cuttings are subjected to neutron bombardment for a predetermined length of time and transferred to a fourth Geiger-Müller counter whereby the induced radioactivity is determined, also involving a uniform geometry of the sample with respect to the counter. If desired, the output of the fourth Geiger-Müller counter can be applied to a single recorder which will plot, upon correction for sample lag, a neutron log with respect to depth. Preferably, the output of the third and fourth counters may be simultaneously applied to a differential recorder in which a correction on the induced radioactivity is made for the initial natural radioactivity of the cuttings.

Therefore, according to the present invention a series of three continuous recorders is preferably employed; the first plotting as a series of points the change in natural radioactivity of the drilling fluid with drilling depth, the second recording the change in natural radioactivity of the drill cuttings with depth and the third recording the induced radioactivity of the cuttings with depth of the hole. In all cases the depth is corrected for sample lag so that a true indication of radioactivity is obtained as a function of the actual depth at which the sample was taken. The record obtained from the logging process of the present invention preferably appears as a series of points plotted during drilling operations from which the drilling engineer can readily ascertain the nature of the formation being penetrated, as well as by comparison with radioactivity logs of surrounding wells, if any, the proximity of the bore hole bottom to known producing formations in the area. The instruments are readily made automatic and may be actuated to record periodically. Preferably a sample is detected and recorded in accordance with change in hole depth so that each point on the curves corresponds to an additional increment of depth such as an inch, a few inches, a foot, etc.

Besides the advantages of being able to obtain an immediate and continuous log during the operation, a further advantage is obtained which is not obtainable in the conventional radioactivity logging methods. This feature involves the determination of the specific radioactivity of the formation being penetrated; that is, the natural and/or induced gamma-ray activity for a known volume and known weight of drill cuttings may be determined and recorded. Such a specific radioactivity index permits a much more precise designation of particular formations penetrated than that obtainable from conventional radioactivity logs because the data may be compared with known mineral and rock samples with a known geometry which may not be done in conventional radioactive logging.

The operation of the process of the present invention and the apparatus employed will be more clearly understood by reference to the accompanying drawing, in which:

Figure 1 is a schematic flow diagram showing a typical rotary drilling operation as well as the sampling and analysis procedure of the present invention;

Figure 2 is a detail drawing in cross-section of a Geiger-Müller counter applicable to the determination of gamma-ray activity of the circulating mud stream;

Figure 3 is an electrical diagram showing the mode of connection of Geiger-Müller counters to obtain a differential recording of radioactivity such as that employed in the recording of drilling fluid radioactivity;

Figure 4 is a detail drawing of a Geiger-Müller counter suitable for determining the gamma-ray activity of the drill cuttings sample;

Figure 5 shows schematically one modification of a continuous method for analyzing and recording the gamma-ray activity of a drill cuttings sample stream, and Figure 6 is an example of the log obtained.

Referring now more particularly to Figure 1, a bore hole being drilled is provided with upper casing 10 into which kelley 12 extends and which is rotated by a drilling table not shown. Kelley 12 is attached by means of couplings 14 to drill pipe 16 which extends to a drill bit at the bottom of the hole, not shown. Drilling fluid is withdrawn from mud pit 18 and passed through intake line 20 to mud pump 22 driven by prime mover 24. The drilling fluid under pressure passes through fluid inlet line 26 to a point up on the drilling derrick and then through mud hose 28 to mud hose flange connection 30 which connects to kelley 12 by means of swivel 32. The drilling fluid thus injected passes downwardly through kelley 12 and drill string 16 and is jetted against the working face at the bottom of the hole through the drill bit. The drilling fluid then passes, carrying assimilated soft materials and suspended drill cuttings, up through annulus 34 between the casing or the wall of the bore hole and the drill string. The drilling fluid then passes through outlet line 36 onto shaker screen 38 from which the drill cuttings are separated by means of outlet 40. The cuttings-free drilling fluid then passes via line 42 into mud pit 18.

The drilling fluid is sampled at two points; a first sample pump 44 removing a small stream of drilling fluid from discharge line 42 and a second sample pump 46 removing an equivalent amount from inlet line 26. Sample stream flow rate may vary depending upon the sensitivity of the counters, but may conveniently be between about 0.5 and 20 gallons per hour. Two modifications of drilling fluid counting may be used. The first involves a continuous "flushing" of fluid through the chambers between the counting or measuring periods and then stopping the sample flow followed by a period of from about 1 to 60 seconds counting to obtain an accurate determination of the count. The second involves using a continuous flow of fluid through the chamber with a residence time of between 1 and 60 seconds and a continuous determination of the count. Rate meters may be employed satisfactorily for these purposes which are well known in the art and which directly give an indication of the rate at which impulses are received by the Geiger-Müller counter. Recording of the rates thus obtained is preferably intermittent and is performed repeatedly for each successive incremental increase in bore hole depth. The first sample stream passes via line 48 at a rate controlled by control valve 50 in accordance with flow controller 52 through first Geiger-Müller counter 54 and then via line 56 back into the mud pit. Second sample pump 46 passes a stream of drilling fluid via line 58 at a rate controlled by valve 60 in accordance with flow controller 62 through second Geiger-Müller counter 64 and then back into the mud pit via line 66. A detailed drawing of counters 54 and 64 is indicated in Figure 2 subsequently described. An ion current flow through the counter is proportional to the radioactivity of the fluid passing around the counter. The output current from counters 54 and 64 is applied to first recorder 68 which may record separately the radioactivity of the entering and discharging mud streams, or preferably records the difference between these streams as a function of depth as indicated by depth gauge 70 which is corrected for sample lag by means 72 which in turn is actuated by the rate of drilling fluid circulation as indicated by the stroke and piston diameter of fluid circulation pump 22. If desired, depth gauge 70 may be employed to actuate recorder 68 at intervals according to time but preferably it actuates the recorder with change in depth of the drilling apparatus. Thus, a record is made comprising a log from a series of points of gamma-ray activity for every 6 inches, foot, 2 feet, etc. in depth of the hole.

The stream of drill cuttings removed from shaker screen 38 via outlet 40 is introduced into cuttings splitter 80. Splitter 80 operates to separate a representative cuttings sample stream from the total quantity of drill cuttings produced. This sample stream 82 is removed for gamma-ray activity determination while the remainder of the cuttings is passed as stream 84 and discarded. The cuttings sample stream may be produced from splitter 80 in direct weight or volume proportion to total quantity of cuttings produced, if desired, or the quantity of cuttings sample thus separated may be correlated with the drilling rate so that an adequate cuttings sample for every 6 inches or 1 foot of depth of hole made will be obtained.

The amount of cuttings taken for each sample is preferably on the order of from about 1 to about 20 cubic inches bulk.

The cuttings sample is washed in washing step 84 by a stream of water when water-base drilling fluid is used or by a stream of light oil when oil-base drilling fluid is used. This removes quantities of drilling fluid contained on the surfaces of the particles. From the washed sample the surface fluids are subsequently removed in step 86 by means of a stream of warm air or by means of a centrifuge with or without the application of heat to assist in the surface drying. The dried cuttings sample is then passed through third Geiger-Müller counter 88 in which the natural radioactivity of a known volume and weight of cuttings sample is determined. This count or rate determination requires between about 1 and 60 seconds. The output of the third counter is used to actuate the mechanism of recorder 90 which records the natural radioactivity level as a function of sampling depth as indicated by depth gauge 76 and corrected for sample lag by means of correction device 92. The volume of sample contained in third counter 88 may be weighed before or after counting. Preferably the volume of sample contained in third counter 88 and fourth counter 100 are the same. Consequently the weight may be obtained at any time during the handling of any particular sample. The weight of the sample of cuttings is determined by weighing device 94 which also actuates recorder 90 for a constant volume of sample, thus permitting from the record of recorder 90 a determination of the specific radioactivity of the cuttings or the record may be the specific radiation directly, i. e., radiation intensity per unit weight of sample.

The sample of known weight and volume is subjected to neutron bombardment in radiation step 96 for a pre-determined length of time such as between about 0.1 and 2 minutes for a 500 millicurie or a 1 curie source and proportionately longer or less times for weaker or stronger sources. The radiated sample is subsequently passed through fourth Geiger-Müller counter 100 wherein the induced radioactivity is determined by counting for from about 0.1 to 10 seconds and the output applied to third recorder 98. The weight of sample is also recorded as a function of depth as indicated by gauge 76 and corrected for sample lag by means of device 92.

If desired, recorder 98 may be also actuated by the output of third and fourth Geiger-Müller counters 88 and 100 so that the intensity recorded by recorder 98 is the induced activity only and the natural activity of the cuttings sample is indicated in the record of recorder 90.

If desired, recorders 68, 90 and 98 may comprise a single instrument having three parallel records of the natural radioactivity of the mud and of the cuttings and of the induced radioactivity of the cuttings plotted as a function of corrected depth along the length of the chart. A direct comparison may therefore be made of the indications obtained.

Referring now to Figure 2, a detail view in cross-section of a Geiger-Müller counter suitable for determining the activity of the drilling fluid streams is indicated. An annular jacket 110 provided with inlets and outlets 112 and 114 is provided. The drilling fluid is passed through the annular jacket preferably at a constant flow rate and an ionization chamber 116 is inserted in the cylindrical chamber 118 within the annulus. A lead shielding 120 may, if desired, surround the apparatus in order to minimize cosmic ray interference with the indicated natural radioactivity.

Two identical Geiger-Müller counters as shown in Figure 2 are employed for counters 54 and 64 indicated in Figure 1. Of substantial importance is the fact that by employing duplicate counters and a differential recorder 68, the cosmic ray interference and other background indications are constant and the radioactivity indicated is substantially free from background interference. Ionization chamber 116 is provided with terminals 121 and 122 through which the ion current flows and is amplified for detection and recording.

Referring now to Figure 3, a modified Wheatstone bridge is indicated in which counters 54 and 64 and/or counters 88 and 100 may be connected with the associated recorders in order to obtain a true differential reading by the two simultaneously measured activities. Another modification involves use of the apparatus of Figure 3 to obtain a differential between the counts of any of counters 54, 64, 88 or 100 and another counter, shown as counter 85 operating with counter 88 and recorder 90, but exposed only to the atmosphere to detect the background count. The circuit is essentially conventional and is provided with two resistances $R_1$ and $R_2$ in series, the resistances being connected in parallel with two counters 124 and 126 in series. A voltage source 128 is connected between the common terminal of the counters and the common terminal of the resistances. A recorder 130 is provided to indicate the degree of unbalance in the circuit caused by a difference in activity indicated by recorders 124 and 126. A preliminary adjustment of resistor $R_1$ is made to bring the recorder 130 to an indication of balance when no samples are being detected by counters 124 and 126.

Referring now to Figure 4, an apparatus suitable for counting a known volume and weight of cuttings sample is indicated in which cuttings container 140 is disposed in a fixed geometrical relation with Geiger-Müller counter 142 provided with terminals 144 and 146. Container 140 is employed to move the cuttings sample successively through the stages of washing, drying, counting and radiation by supporting it on an intermittently actuated conveyor similar to that shown in Figure 5. The radiation of a known volume of cuttings 148 placed in container 140 reacts on counter 142 from which an intensity reading is obtained. If desired, base 150 may comprise the pan of an automatic recording balance, by means of which the weight of a constant volume of the cuttings sample is determined and recorded. Also, the reverse procedure may be utilized in which the automatic balance accepts a predetermined weight of sample and the volume is recorded. In this way the specific radioactivity of the cuttings may be obtained.

The device shown in Figure 4 is of the kind employed as third and fourth counters 88 and 100 indicated in Figure 1. Preferably the procedure followed involves using a constant volume of cuttings sample and continuously recording the weight of each sample, and even more preferably the record is made on recorders 90 and 98 of the specific gamma-ray count in counts per gram or per pound of sample or a specific differential count in recorder 98 in counts per gram or pound of sample.

The counts recorded in all instances are counting rates and proportional to the number of counts per minute obtained, which in turn is directly proportional to the ion current flow through each counter.

In Figure 5 is shown a modification of the cuttings analysis operation of this invention in which a conveyor 160, intermittently operated according to a predetermined time cycle, moves the cuttings samples 162 delivered from cuttings splitter 164. The cuttings move intermittently from left to right, first through the washing step provided by spray 168 and subsequently through a surface drying step provided by blower 170 which may be operated in conjunction with a heater to facilitate drying. Subsequently the dried cuttings move adjacent third counter 172 wherein a natural gamma-ray activity is determined and subsequently adjacent neutron source 174 by means of which the cuttings are irradiated. The irradiated cuttings then pass adjacent fourth counter 176 wherein the induced gamma-ray activity is determined. The analyzed cuttings 178 are then disposed of or retained as samples, permitting a more complete log of the drilling operation.

A modified continuous sampling and analysis procedure involves the mechanical movement of a container full of a certain volume of cuttings through the steps indicated in Figure 1; from the washing step to the drying step, to counter 88, then to neutron bombarding unit 96 and then to counter 100 with a weighing step 94 at any point along the line but preferably following the drying step. This modification is a preferred one and is analogous to that shown in Figure 5 altered to the extent that conveyor 160 carries a cuttings sample container along instead of the cuttings 162 indicated there.

In Figure 6 a strip of recorder chart paper 180 which is moved in proportion to the depth of the bore is shown on which points 182 indicate variations in the differential gamma-ray counts of counters 54 and 64, points 184 indicate the specific natural gamma-ray count of the cuttings, and points 186 indicate the specific differential induced radioactivity of the cuttings, these plots being made by well known recording methods.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for logging bore holes during progress of drilling which comprises in combination the steps of measuring the natural radioactivity of drilling fluid entering the bore hole, measuring the radioactivity of the drilling fluid leaving the bore hole thereby determining the change in the natural radioactivity of the fluid, separating drill cuttings from drilling fluid leaving the bore hole, measuring the natural radioactivity thereof, subsequently irradiating the cuttings with a neutron source, next measuring the induced radioactivity of the cuttings, and continuously recording the radioactivity measurements as a function of bore hole depth.

2. A method for bore hole logging during drilling which comprises circulating a drilling fluid first through the drill string and bit and next through the annular space surrounding the drill string, separating drill cuttings from the fluid flowing from the bore, separating a first sample stream of fluid flowing into the hole, measuring the natural radioactivity thereof, separating a second sample stream of cuttings-free fluid flowing from the hole, measuring the natural radioactivity thereof thereby obtaining a measure of the change in the drilling fluid radioactivity, separating a fraction of the separated drill cuttings, measuring the natural radioactivity thereof, subsequently irradiating said fraction of cuttings with a neutron source, then measuring the induced radioactivity thereof, continuously measuring the depth of the bore hole at which drilling is proceeding, and recording the measured radioactivities as a function of drilling depth.

3. A method for radioactive logging of bore holes during the progress of drilling which comprises in combination with rotary drilling and circulation of a drilling fluid through the bore hole, the steps of separating suspended drill cuttings from the fluid flowing from the hole, measuring the weight of a constant volume thereof, measuring the natural radioactivity of said cuttings to determine the specific radioactivity thereof, subsequently irradiating said cuttings with a neutron source, then measuring the induced radioactivity thereof, measuring the natural radioactivity of the drilling fluid entering the hole, measuring the natural radioactivity of the drilling fluid discharging from the hole thereby obtaining a measure of the change in the drilling fluid radioactivity, continuously measuring the depth of the drilling, and recording the measured radioactivities as a function of depth.

4. A method according to claim 3 in combination with the step of continuously measuring the sample lag and correcting the measured bore hole depth therefor.

5. A method according to claim 3 in combination with the step of continuously removing for radioactivity measurement sample streams of identical flow rates from the drilling fluid streams flowing into and out of the well, and continuously recording the difference between the measured natural radioactivity of said streams.

6. A method according to claim 5 in combination with the step of continuously recording the difference between the natural and induced radioactivity of said cuttings.

7. A method for continuously radioactive logging of the formations penetrated by a bore hole which comprises in combination with rotary drilling and circulation of a drilling fluid through the bore hole, the steps of removing a first sample stream of drilling fluid from that flowing into the bore hole, removing a second sample stream thereof from the cuttings-free stream flowing from the bore hole, passing the first and second sample streams at identical rates through identical Geiger-Müller counting zones, continuously measuring the natural radioactivity of the two sample streams thereby determining the change in drilling fluid radioactivity, continuously measuring the depth at which drilling proceeds, continuously measuring the sample lag between the bottom of the hole and the surface, recording the measured natural radioactivities of said drilling fluid streams as an index of the amount and kind of soft material assimilated from the formation into the circulating fluid, separating drill cuttings from drilling fluid leaving the bore hole, measuring the natural radioactivity thereof, subsequently irradiating the cuttings with a neutron source, next measuring the induced radioactivity of the cuttings, and continuously recording the radioactivity measurements as a function of bore hole depth corrected for the measured sample lag.

8. A method according to claim 7 wherein the differential between the radioactivities of said first and second sample streams is measured and recorded as a function of corrected depth.

9. A method according to claim 7 wherein the flow rate of each sample stream is controlled in accordance with the flow rate of the drilling fluid stream from which the sample stream is taken.

10. A method for continuous radioactive logging of bore holes during progress of drilling which comprises in combination with rotary drilling and circulating a drilling fluid through the bore hole, the steps of screening the drill cuttings from the drilling fluid discharging from the bore hole, separating a fractional portion of the cuttings as a cuttings sample, moving said sample successively by means of an intermittently operated transporting means through steps of first washing residual drilling fluid from the surface thereof, subsequently drying the surface of the cuttings sample, then measuring the natural radioactivity of the washed and dried sample, next bombarding said sample with neutrons to induce further radioactivity, and then measuring the induced radioactivity, continuously measuring the depth of the bore hole, correcting the measured depth for sample lag, recording the natural and induced radioactivity of cuttings samples as a function of the corrected bore hole depth, measuring the natural radioactivity of the drilling fluid entering the bore hole, measuring the radioactivity of the cuttings-free drilling fluid leaving the bore hole thereby determining the change in the natural radioactivity of the fluid, and recording the measured change of natural radioactivity as a function of corrected bore hole depth.

11. A method according to claim 10 in combination with the steps of employing a known volume of cuttings sample, weighing the cuttings sample of the known volume, and recording the specific radioactivity, the radioactive intensity per unit weight of cuttings.

12. A method according to claim 10 wherein the natural radioactivity of the cuttings is measured as a differential by the steps of simultaneously and separately measuring the background radioactivity in the absence of exposure to the cuttings sample.

13. A method according to claim 10 in combination with the step of recording the induced radioactivity as the differential between the measured natural and induced radioactivity of the cuttings sample.

14. An apparatus for logging a bore hole by radioactive means during drilling which comprises in combination with conventional rotary drilling and drilling fluid circulation apparatus and conventional apparatus for measuring bore hole depth and correcting for sample lag, a shaker screen for separating drill cuttings from the circulating drilling fluid, a first and second Geiger-Müller counter each provided with a chamber for the passage therethrough of drilling fluid, a first and second drilling fluid sample pump, said first pump having its inlet connected to the drilling fluid discharge line from the bore hole and its outlet connected to said chamber of said first Geiger-Müller counter, said second pump having its inlet connected to the drilling fluid inlet line to the bore hole and its outlet connected to said chamber of said second Geiger-Müller counter, a recording instrument for recording the radioactive intensity indicated by said first and second counters, a third and fourth Geiger-Müller counters, separator means for removing samples of drill cuttings from said shaker screen, washing means for removing residual drilling fluid from said sample, drying means for subsequently surface drying said sample, a weighing device for determining the weight of each successive sample, a neutron source, means for moving said sample successively through a series of fixed positions first adjacent said third Geiger-Müller counter, second adjacent said neutron source, and third adjacent said fourth Geiger-Müller counter, a recording instrument for recording the measured radioactive intensities on a moving chart, and means for moving said chart in accordance with the depth of the bore hole.

15. An apparatus according to claim 14 in combination with a differential recording instrument connected to said first and second Geiger-Müller counters, another differential recording instrument connected to said third and fourth Geiger-Müller counters, and a separate recording instrument connected to and actuated solely by said third Geiger-Müller counter.

16. An apparatus according to claim 14 in combination with a cuttings sample container of known fixed volume adapted to be carried along by said sample moving means through said series of fixed positions.

References Cited in the file of this patent

UNITED STATES PATENTS

| Number | Name | Date |
| --- | --- | --- |
| 2,214,674 | Hayward | Sept. 10, 1940 |
| 2,263,108 | Stuart | Nov. 18, 1941 |
| 2,326,219 | Hayward | Aug. 10, 1943 |
| 2,390,931 | Fearon | Dec. 11, 1945 |
| 2,528,955 | Hayward | Nov. 7, 1950 |
| 2,583,288 | Arps | Jan. 22, 1952 |

OTHER REFERENCES

"Some Practical Aspects of Radioactivity Well Logging," Jackson et al., AIMME Technical Publication #1923, printed in the September 1945 issue of Petroleum Technology. Pages 1–5 of the AIMME publication.